*INVENTOR.*
MASATOSHI SHIMADA
BY Kurt Kelman
AGENTS

INVENTOR.
MASATOSHI SHIMADA
BY
Kurt Kelman
AGENTS

INVENTOR.
MASATOSHI SHIMADA

BY Kurt Kelman

AGENTS

Nov. 8, 1966 MASATOSHI SHIMADA 3,284,673

SIGNAL SELECTOR

Filed Jan. 4, 1963

INVENTOR.
MASATOSHI SHIMADA

BY Kurt Kelman

AGENTS

INVENTOR.
MASATOSHI SHIMADA

BY Kurt Kelman

AGENTS 3,284,673

SIGNAL SELECTOR

Masatoshi Shimada, 78 2-chome, Todoroki, Tamagawa, Setagayaku, Tokyo, Japan

Filed Jan 4, 1963, Ser. No. 249,517
Claims priority, application Japan, Jan. 9, 1962, 37/325; Feb. 10, 1962, 37/4,399
10 Claims. (Cl. 317—147)

Figure 1:
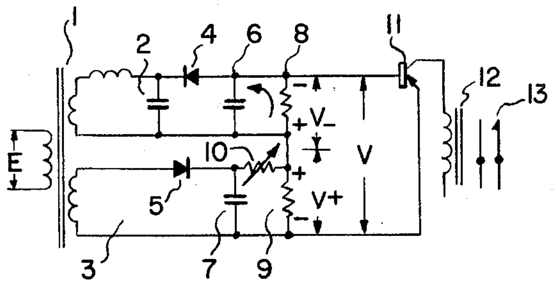
Figure 4:
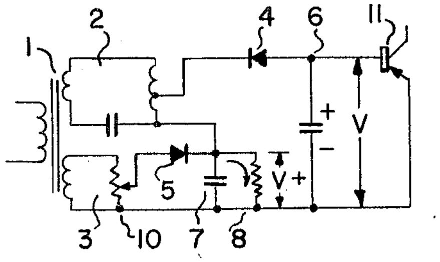
Figure 2:
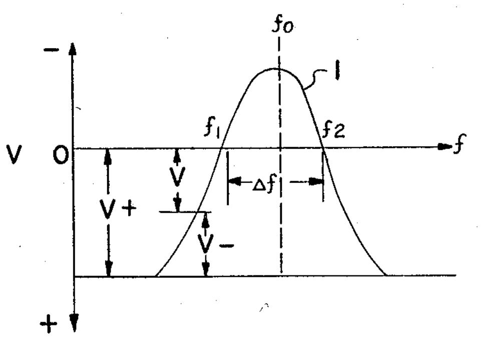
Figure 5:
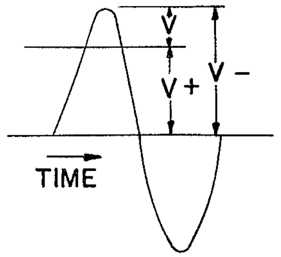
Figure 6:
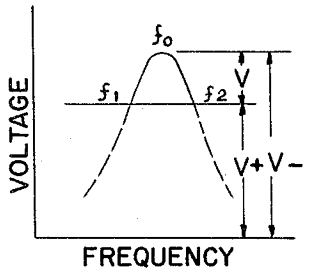
Figure 7:
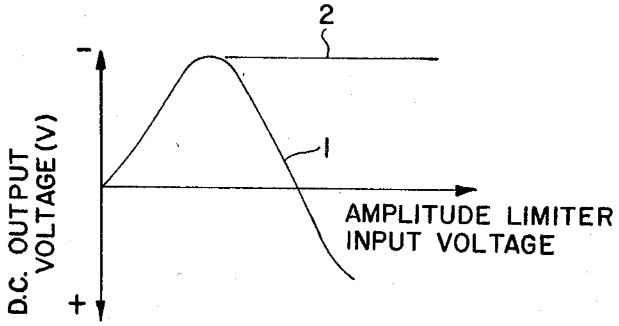
Figure 10:
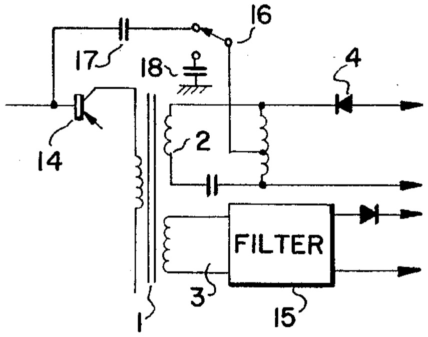
Figure 11:
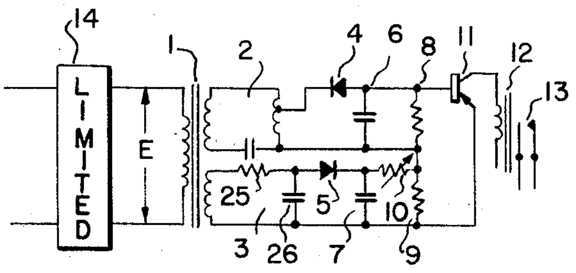
Figure 12:
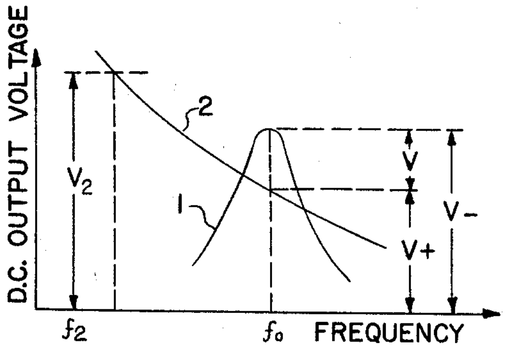
Figure 14:
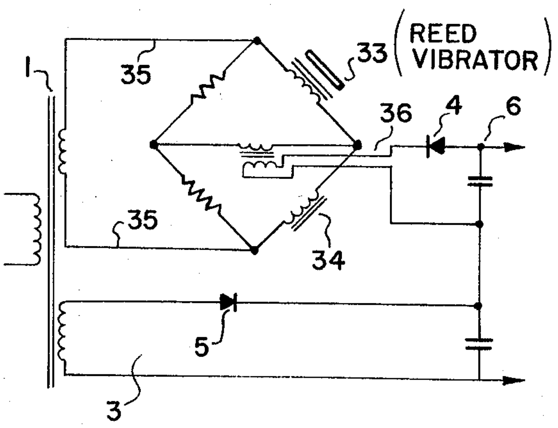
Figure 15:
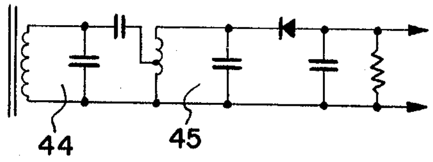
Figure 16:
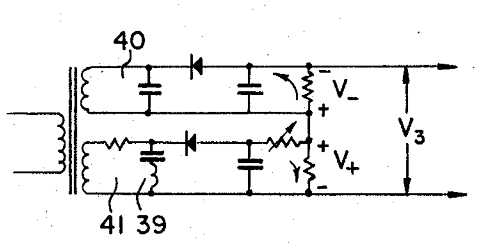

This invention relates to a signal selecting device for selecting a signal of a particular frequency to operate a signal detecting device. Reed selectors used today for this purpose have some difficulties in manufacture and alignment and sometimes cause misoperation due to voice frequencies, noises or harmonics. This invention is intended to eliminate such disadvantages. The invention will now be fully described by way of example with the accompanying drawings, in which FIGS. 1, 3, 4, 8 through 11, 13, 17 and 18 show circuit connections embodying the invention; FIG. 2 shows a graph explaining the operation of the circuit in FIG. 1; FIGS. 5 and 6 show graphs explaining the operation of the circuit in FIG. 4, FIG. 7 shows an input-output characteristic curve for the circuit shown in FIGS. 8 and 9; FIG. 12 shows a graph explaining the operation of the circuit in FIG. 11; and FIGS. 14 through 16 show other examples of resonant circuits. In FIG. 1 the numeral 1 shows a transformer connected to an audio frequency amplifier output E, 2 shows a tuning circuit connected to a secondary winding of the transformer and resonant to the signal frequency, and 3 shows a secondary winding of the transformer. Hereinafter, the circuit connected to the winding 3 will be referred to as the untuned circuit in contrast with the tuned circuit 2. Numerals 4 and 5 show rectifiers, 6 and 7 show smoothing capacitors, 8 and 9 show load resistors, 12 a relay connected to the collector of transistor 11, 13 shows a contact circuit of the relay 12, and 10 a variable resistor for adjusting the D.C. output voltage. Now when a signal voltage E is applied to the primary of the transformer 1, the voltages appearing on the respective secondaries of the transformer will be rectified and, with the rectifiers 4 and 5 connected in the direction shown, then the respective output voltages V— and V+ will be produced across load resistors 8 and 9, and combined with opposite polarities, providing a resultant voltage as shown. If the resonant circuit 2 is resonant to the applied frequency and the variable resistor 10 is adjusted to have $V- > V+$, the base voltage of transistor 11 will be negative so that a collector current will flow and energize the relay 12 to close contacts 13, which will operate a calling circuit connected thereto. However, as the input frequency departs from the resonant frequency, the output voltage V— of the tuned circuit 2 will decrease in dependence upon its tuning characteristics while the output voltage V+ of the untuned circuit 3 remains nearly constant, so that V becomes positive. This results in relay 12 being not operated because no collector current flows in transistor 11. FIG. 2 shows the variations of V+, V— and V when input voltage E is constant while its frequency alone changes. It is seen from the graph that, in the frequency range from $f_1$ to $f_2$ where $f_1$ and $f_2$ are intersections of the straight line for $V=0$ and the tuning curve 1, the base voltage of the transistor 11 is negative and collector current flows. On the other hand for frequencies outside this band, V takes a positive value and no collector current flows. Thus this circuit responds only to signals having frequencies between $f_1$ and $f_2$, so if $\Delta f$ is the frequency difference between $f_1$ and $f_2$, it follows that the smaller the $\Delta f$, the better is the selectivity of the signal selecting apparatus with less possibility of interference and more signal channels may be provided because less frequency difference between adjacent signal frequencies may be allowed. The value of $\Delta f$ may arbitrarily be chosen by adjusting the voltage V+.

Since V— and V+ are both proportional to input voltage E, $V-=K_1E$, $V+=K_2E$.

Therefore $$V=(K_1-K_2)E \quad (1)$$

where $K_1$, and $K_2$ are proportionality constants. V+ is constant while V— varies with frequency as shown by the curve 1 in FIG. 2, i.e., $K_2$ is constant while $K_1$, varies with frequency. Consequently at a certain frequency, $K_1$ becomes equal to $K_2$, wherefore, at this frequency, $V=0$, which is independent of the value of E. In other words the condition for $V=0$ is dependent only on frequency and independent of the value of E. Thus, as shown in FIG. 2, the frequency range $f_1$–$f_2$ to produce a negative output voltage is always constant regardless of any change in the input voltage E and, as is obvious from Equation 1, the polarity of V is determined only by $(K_1-K_2)$ and is independent of the change in E. In other words, when V is positive at certain frequencies, V is positive regardless of any change in input voltage E and never takes a negative value, the polarity of the output voltage V changing with frequency change only. Thus, by adjusting the variable resistor 10 and the tuning frequency of the tuning circuit 2 in FIG. 1 so as to establish a frequency range $f_1$–$f_2$ where V becomes negative, a very stable frequency selecting circuit may be provided since such range $f_1$—$f_2$ never changes with variations of the input voltage. As is well known, frequency discriminators usually used for frequency modulated receivers also produce D.C. output voltage whose polarity changes not with input voltage but with its frequency only, the polarity of the output voltage being reversed depending upon whether the signal frequency is higher or lower than the central frequency of the discriminator. In contrast with that, the circuit of the invention produces an output voltage whose polarity is reversed depending upon whether the incoming signal falls within or outside a certain frequency band. When compared with said frequency discriminators it can be said to be an entirely new circuit capable of discriminating between frequency bands.

Figure 3:
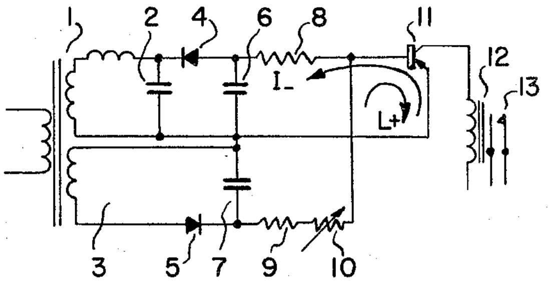

In addition to the example in which the difference between output voltage V+ and V— has been used, there is shown in FIG. 3 another example in which output current difference is used. In that figure identical numerals denote identical parts as in FIG. 1 and the arrows show the direction of the flow of currents. If currents I+ and I— are used in place of V+ and V—, a similar operation will result.

Although in the examples shown in FIGS. 1 and 3 the design is such that a calling system is operated by a relay which responds to the change in output voltage or current of the signal selecting apparatus in accordance with the invention, other detecting means such as loud speakers or bells may be used, provided that they can respond to the incoming signal waves.

FIG. 4 shows the special case where the load resistor 8 in FIG. 1 is infinite and smoothing capacitor 6 is inserted between the output terminals. The D.C. output voltage of the untuned circuit 3 acts as the bias voltage for rectifier 4 connected to tuned circuit 2. Hence, a current flows through the rectifier 4 when the peak value of A.C. output voltage from tuned circuit 2 exceeds the D.C. voltage $V_1$; consequently a resultant voltage appears across the condenser 6. If the polarities of rectifiers 4 and 5 are as shown in FIG. 4, the base current of transistor 11 will be caused to flow by this resultant voltage. This voltage varies with frequency as shown in FIG. 6 and becomes zero at frequencies $f_1$ and $f_2$. At frequencies outside the band $f_1$–$f_2$, the bias voltage V+ will be greater than the peak value of the A.C. voltage acting on the rectifier 4 and will cut off the rectifier 4 and the D.C. output voltage V will be zero. In this case, the frequency is $f_1$ and $f_2$ at which the resultant output voltage becomes zero, are independent of variation of the input signal voltage E, as described in the case of FIG. 1, and whereas the polarity of the resultant voltage changes at $f_1$ and $f_2$, as shown in FIG. 2, in the case of FIG. 4, it has a different feature in that the resultant voltage appears across the condenser 6 when the input frequency is within the frequency band $f_1$–$f_2$, but does not when input frequency is outside the frequency band $f_1$–$f_2$. Moreover, since the circuit of FIG. 4 has no load resistor 8 for the tuning circuit 2 as compared with FIG. 1 the output energy from the tuning circuit may be almost all used as output voltage V, thereby making it possible to produce a D.C. output most efficiently and enhance the selectivity of the tuning circuit 2.

Figure 8:
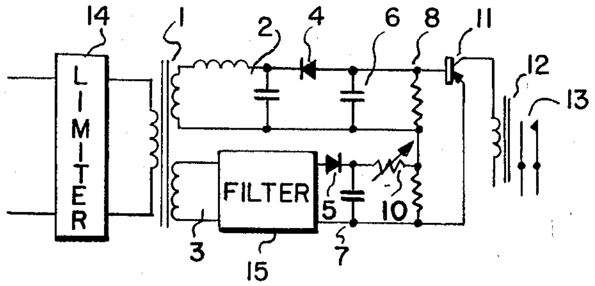

Since this invention is only intended to detect whether the major part of the energy of the input signal is within a predetermined bandwidth, or not, the amplification of the signal may be quite easily obtained, because there is no need to consider stability, distortion and the like. Therefore, it is desirable to use a preceding amplitude limiter 14, as shown in FIG. 8, obtaining a constant resultant output voltage. The relation between input voltage E of the amplitude limiter 14 and the resultant output voltage V when a preceding amplitude limiter is used, is shown by curve 1 in FIG. 7. As seen, the resultant output voltage V is not constant contrary to expectation. This is because upon the saturation of signal due to the amplitude limiter many harmonics arise and the fundamental wave causing the output of the tuning circuit 2 slightly decreases while the voltage from the untuned circuit 3 slightly increases with input voltage, so that the difference voltage begins to decrease as the limiter begins to limit. Finally, a reversal of polarity will take place. The only difference between the non-saturated and the saturated conditions is that the second, third or other higher harmonics are included in the latter. However, in the tuning circuit 2 to produce voltage V— the second and the third harmonics are almost perfectly eliminated because of its selectivity. Therefore it can be concluded that the cause for the aforementioned phenomenon is the harmonics included in the untuned circuit 3. Thus, in FIG. 8, a low pass filter 15 is inserted in untuned circuit 3 to eliminate such harmonics. With this arrangement a voltage change on the primary side of the transformer 1 will cause the same output voltage change to appear, and as the voltage variations on the primary side of transformer 1 are restrained by the pre-stage amplitude limiter 14, the output voltage V will be held nearly constant in spite of input voltage variations. Curve 2 in FIG. 7 shows the characteristics obtained by such insertion of low-pass filter 15 in the untuned circuit 3. It will be understood from the preceding descriptions that even if the low pass filter 15 is inserted between the limiter 14 and input transformer 1 as shown in FIG. 9, the operation and function will be the same as that in FIG. 8.

Figure 9:
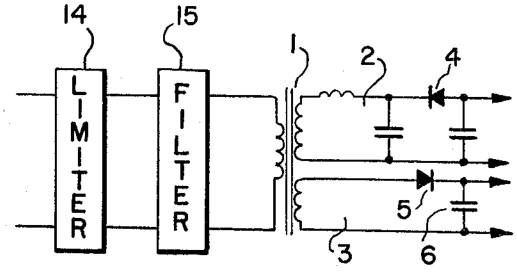

But in some uses, the selecting devices shown in FIG. 8 and FIG. 9 present entirely different functions. For example if it is possible to use the selecting device as a signal selector and as a signal oscillator, it may be effective in compact and inexpensive construction for a small transceiver and the like. FIG. 10 shows an example of such a circuit, in which 16 is a transmission reception selector switch and capacitors 17 and 18 serve to compensate for the difference between frequencies to be transmitted and to be received. As shown, a portion of the output from tuned circuit 2 is fed back to the base of the transistor 14 acting as an amplitude limiter to form an oscillator. When a low-pass filter 15 exists, as in FIG. 9, between the limiter 14 and tuning circuit 2, oscillation can hardly occur because of the phase shift in said low-pass filter. However, the circuit in FIG. 8 is free from such a problem and oscillation can occur. Now consider the case where a voice voltage including the same frequency component as the tuning frequency of the tuning circuit 2 is applied to the primary of the transformer 1 in FIG. 1. The voltage appearing on the untuned circuit 3 will then include this frequency component and others, therefore even if the condition $V- > V+$ would hold at a pure input frequency, the output voltage V+ of the untuned circuit may be greater than the output voltage V— of the tuning circuit. When the output voltage V, i.e., the difference between V— and V+ is taken to be sufficiently large, the gain of the tuning circuit 2 will be greater and therefore the relation $V- > V+$ will not always hold when there is a voice input. Namely there is a possibility of misoperation due to a voice input. However, considering that most voice components exist below 1000 c.p.s. and this device is intended chiefly for operation above 1000 c.p.s., and that most of the voice components therefore exist below the selected frequency of the device, this misoperation due to voices may be reduced in practical usage. Another example of the invention will be obtained as shown in FIG. 11 in which misoperation due to voices is prevented. As seen there is provided in untuned circuit 3 an attenuation circuit comprising a resistor 25 and a capacitor 26. The frequency characteristics of the circuit is shown in FIG. 12 where the abscissa and ordinate represent input signal frequency and D.C. output voltage, respectively. Curves (1) and (2) show the output D.C. voltage vs. frequency relationships for the tuning circuit 2 and the untuned circuit 3, respectively with a constant voltage applied to the primary of the transformer 1. It will be understood that with proper choice of the constants of the attenuation circuit, the D.C. output voltage of the untuned circuit rises as the frequency falls below $f_0$. If the circuit is adjusted so that $V- > V+$ and hence V will be negative at frequency $f_0$, then, when a voice voltage containing a component frequency $f_0$ is applied, it is possible to make the output V+ of the untuned circuit greater than the output V— of the tuned circuit, because the gain of the untuned circuit is high for frequencies below $f_0$ and most voice components exist below $f_0$. Thus this circuit can prevent misoperation due to voice voltages. As to misoperation due to harmonics, the situations are just the same as for voice voltages. That is, as shown in FIGS. 11 and 12, when a signal frequency $f_0$ is impressed on the input circuit, the two branch circuits will produce a voltage V— and V+ respectively, but when a signal $f_2$ is impressed which is of the same voltage but has a frequency just half of $f_0$, the untuned circuit 3 will produce an output voltage $V_2$, but the output of the tuning circuit 2 is produced by the second harmonic component of $V_2$, and therefore is a fraction of the value of V— which is produced by a fundamental signal input.

Therefore, it is possible to make the output of the untuned circuit greater than the output of the tuned circuit by giving the frequency characteristic of the untuned circuit a suitable value. Thus the resultant output V will never have a negative polarity for any harmonic component of input signal.

Figure 13:
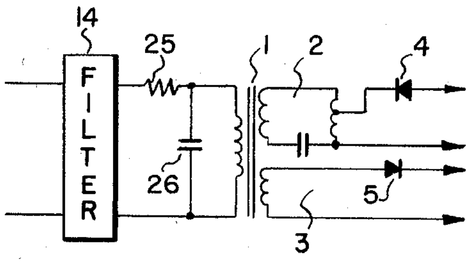

In FIG. 13, there is shown another embodiment of the invention provided with resistor 25 and capacitor 26 on the primary side of the transformer 1 to realize such frequency characteristics as shown in FIG. 12, the other parts being omitted because they are substantially similar to those in FIG. 11. The operation and function are the same as in FIG. 11. Although in FIGS. 11 and 13 the resistor 25 and capacitor 26 have been used to obtain such frequency characteristics as mentioned before, the same result may be obtained without resistor 25 by proper choice of impedance of the transformer or the capacitor.

In the descriptions so far, the tuning circuit 2 has been illustrated as having the coil and capacitor connected in series or parallel, but for the purpose of this invention it is not always necessary to use such types of circuit. As is obvious from the foregoing explanations and from the curve in FIG. 2, and Equation 1, the only requirement for the circuit is to have a resonant characteristic and presenting an output voltage proportional to input voltage. FIGS. 14, 15 and 16 show examples of such circuits. The circuit of FIG. 14 shows sharp tuning characteristics such that when a reed vibrator 33 is at resonance the bridge goes out of balance and an output appears at output terminal 36. FIG. 15 shows a compound tuning circuit where the tuning circuits 44 and 45 are loosely coupled. In FIG. 16 the D.C. outputs from a parallel tuning circuit 40 and a series tuning circuit 39 are differentially brought together to get a differential D.C. output, which have the same response characteristic as that shown in FIG. 15, that is the product of the two response characteristics resulting in a sharp response characteristic.

Figure 17:
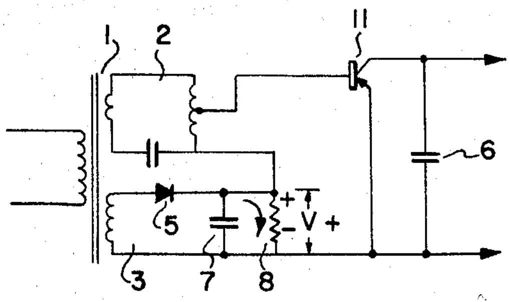
Figure 18:
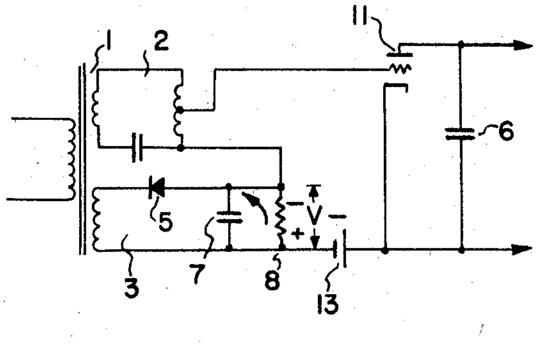

A transistor or a vacuum tube can be used in place of the diode in the aforementioned examples of this invention, as shown in FIGS. 17 and 18. FIG. 17 corresponds to FIG. 4, the only difference being that in FIG. 17 the rectifier 4 is omitted and the smoothing capacitor 6 is connected to the collector of transistor 11. The A.C. output voltage from tuning circuit 2 abruptly increases around the resonant frequency, and in a frequency range $f_1$–$f_2$ where its peak value exceeds the bias voltage V+, the base current will flow in pulses with a resultant pulsating flow of the collector current, which after being smoothed by a smoothing capacitor 6, will produce a D.C. collector current. This D.C. current may be employed in various well known methods to operate a signal detecting device. FIG. 18 shows a circuit using a vacuum tube 9 in place of transistor 11 in FIG. 17. In this case, with the direction of the rectifier 5 as shown and the bias battery voltage properly chosen, the plate current will flow through the tube 11 when the signal within the predetermined bandwidth is impressed. Subsequently the operation will be the same as in FIG. 17.

What is claimed is:

1. Frequency selective apparatus responsive to a call signal of a given frequency comprising:

an input signal receiving circuit;

a first branch circuit connected to be energized by said signal receiving circuit and to provide an output voltage;

a second branch circuit connected to be energized by said signal receiving circuit, having rectifier means to provide a D.C. output voltage;

one of said branch circuits including a resonant circuit providing a maximum output at said call signal frequency and the output of the other branch circuit being substantially independent of frequency and proportional only to the amplitude of the input signal;

an electron discharge device such as a transistor having a base, an emitter and a collector;

means for applying said output voltage of said first branch circuit between the base and emitter of said transistor;

an electro-responsive device connected to the collector of said transistor;

means for applying said D.C. output voltage of said second branch circuit between the base and emitter of said transistor with such a polarity as to decrease the base current of said transistor, so that when the output voltage of said first branch circuit exceeds the D.C. output voltage of said second branch circuit said transistor is activated by flowing of its base current, and in setting said respective output voltages of said first and second branch circuits to such relative values that said base current has approximately a zero value at one predetermined input frequency above and another below the resonant frequency of said resonant circuit;

whereby, a base current activating said transistor will flow when a signal having a frequency in the band between said predetermined frequencies is impressed on said signal receiving circuit, and no base current will flow when an input signal having a frequency outside said band is impressed on said signal receiving circuit, and whereby said band is substantially independent of variations of the input signal voltage.

2. A frequency selective apparatus according to claim 1, in which said first branch circuit includes a rectifier producing pulses of D.C. output voltage and means for reversely biasing said rectifier with the D.C. output voltage of said second branch circuit.

3. A frequency selective apparatus according to claim 1, in which one of said branch circuits includes a low pass filter which rejects harmonic components of the call signal.

4. A frequency selective apparatus, as defined in claim 3, in which said low pass filter has an attenuation which increases with increasing frequency.

5. A frequency selective apparatus defined as in claim 1, including means for adjusting the output voltage of one of said branch circuits and thereby adjusting the width of said frequency band.

6. A frequency selective apparatus responsive to a call signal of a given frequency comprising:

an input signal receiving circuit;

a first branch circuit connected to be energized by said signal receiving circuit and to provide an output voltage;

a second branch circuit connected to be energized by said signal receiving circuit, having rectifier means to provide a D.C. output voltage;

one of said branch circuits including a resonant circuit providing a maximum output voltage at said call signal frequency and the output of the other branch circuit being substantially independent of frequency and proportional only to the amplitude of the input signal;

a transistor having a base, an emitter, and a collector;

means for applying the output voltage of said first branch circuit between the base and emitter of said transistor;

an electro-responsive device connected to the collector of said transistor;

means for superimposing said D.C. output voltage on the output voltage of said first branch circuit and with a polarity such as to decrease the base current of said transistor, so that when the output voltage of said first branch circuit exceeds the D.C. voltage of said second branch circuit, the impedance between emitter and collector of said transistor is decreased by a flowing of base current;

said branch circuits being adjusted so that their output voltages produce a base current of a nearly zero value at one predetermined input frequency above and another below the resonant frequency of said resonant circuit;

whereby said impedance of the transistor becomes comparatively small when an input signal having a frequency within a predetermined band including said resonant frequency is impressed on said signal receiving circuit and said impedance becomes substantially infinite when an input signal having a frequency outside said predetermined band is impressed on said signal receiving circuit, and whereby said predetermined frequency band is substantially independent of variations of the input signal voltage.

7. Frequency selective apparatus responsive to a call signal of a given frequency comprising an input signal receiving circuit including a voltage limiter, and filter means for attenuating harmonic frequency components produced by said limiter;

a first branch circuit connected to be energized by said signal receiving circuit and to provide an output voltage;

a second branch circuit connected to be energized by said signal receiving circuit, having rectifier means to provide a D.C. output voltage;

one of said branch circuits including a resonant circuit providing a maximum output at said call signal frequency and the output of the other branch circuit being substantially independent of frequency and proportional only to the amplitude of the input signal;

an electron discharge device such as a transistor having a base, an emitter and a collector;

means for applying said output voltage of said first branch circuit between the base and emitter of said transistor;

an electro-responsive device connected to the collector of said transistor;

means for applying said D.C. output voltage of said second branch circuit between the base and emitter of said transistor with such a polarity as to decrease the base current of said transistor, so that when the output voltage of said first branch circuit exceeds the D.C. output voltage of said second branch circuit said transistor is activated by flowing of its base current, and in setting said respective output voltages of said first and second branch circuits to such relative values that said base current has approximately a zero value at one predetermined input frequency above and another below the resonant frequency of said resonant circuit;

whereby, a base current activating said transistor will flow when a signal having a frequency in the band between said predetermined frequencies is impressed on said signal receiving circuit, and no base current will flow when an input signal having a frequency outside said band is impressed on said signal receiving circuit;

and whereby said band is substantially independent of variations of the input signal voltage.

8. Frequency selective apparatus responsive to a call signal of a given frequency comprising an input signal receiving circuit including amplifier means, and means including regenerative feed back circuit means for coupling said amplifier means and said receiving circuit for generating oscillations;

a first branch circuit connected to be energized by said signal receiving circuit and to provide an output voltage;

a second branch circuit connected to be energized by said signal receiving circuit, having rectifier means to provide a D.C. output voltage;

one of said branch circuits including a resonant circuit providing a maximum output at said call signal frequency and the output of the other branch circuit being substantially independent of frequency and proportional only to the amplitude of the input signal;

an electron discharge device such as a transistor having a base, an emitter and a collector;

means for applying said output voltage of said first branch circuit between the base and emitter of said transistor;

an electro-responsive device connected to the collector of said transistor;

means for applying said D.C. output voltage of said second branch circuit between the base and emitter of said transistor with such a polarity as to decrease the base current of said transistor, so that when the output voltage of said first branch circuit exceeds the D.C. output voltage of said second branch circuit said transistor is activated by flowing of its base current, and in setting said respective output voltages of said first and second branch circuits to such relative values that said base current has approximately a zero value at one predetermined input frequency above and another below the resonant frequency of said resonant circuit;

whereby, a base current activating said transistor will flow when a signal having a frequency in the band between said predetermined frequencies is impressed on said signal receiving circuit, and no base current will flow when an input signal having a frequency outside said band is impressed on said signal receiving circuit;

and whereby said band is substantially independent of variations of the input signal voltage.

9. A frequency selective apparatus according to claim 1, in which said means for applying said output voltage of said first branch circuit to the base of said transistor includes a diode with such a polarity as to produce pulses of D.C. voltage opposed to that of second branch circuit and a smoothing condenser connected across the base and the emitter of said transistor and means for biasing said diode with the output voltage of said second branch circuit.

10. A frequency selective apparatus according to claim 1, in which said resonant circuit is a compound band pass filter.

References Cited by the Examiner

UNITED STATES PATENTS

| | | | |
|---|---|---|---|
| 1,902,496 | 3/1933 | Fitz Gerald | 324—78 |
| 1,959,161 | 5/1934 | Grondahl | 317—147 X |
| 2,131,736 | 10/1938 | Hoppe | 317—147 X |
| 2,398,419 | 4/1946 | Finison | 317—147 X |
| 2,457,278 | 12/1948 | Schoenbaum | 324—82 |
| 2,541,067 | 2/1951 | Jaynes | 324—82 |
| 2,537,998 | 6/1951 | Henquet et al. | 317—147 X |
| 2,569,000 | 9/1951 | Hadfield | 317—147 X |
| 2,721,962 | 10/1955 | Kretsch et al. | 317—147 X |
| 2,900,600 | 8/1959 | Gregson | 324—82 |
| 3,098,179 | 7/1963 | Van Rossum et al. | 317—147 |
| 3,159,825 | 12/1964 | Bianchi et al. | 340—248 |
| 3,164,779 | 1/1965 | Pleasure. | |

MILTON O. HIRSHFIELD, *Primary Examiner.*

SAMUEL BERNSTEIN, *Examiner.*

R. V. LUPO, *Assistant Examiner.*